United States Patent
Fleming et al.

(10) Patent No.: US 10,997,403 B1
(45) Date of Patent: May 4, 2021

(54) SYSTEM AND METHOD FOR AUTOMATED SELECTION OF BEST DESCRIPTION FROM DESCRIPTIONS EXTRACTED FROM A PLURALITY OF DATA SOURCES USING NUMERIC COMPARISON AND TEXTUAL CENTRALITY MEASURE

(71) Applicant: First American Financial Corporation, Santa Ana, CA (US)

(72) Inventors: Mark Fleming, Santa Ana, CA (US); Yan Qiu, Santa Ana, CA (US)

(73) Assignee: FIRST AMERICAN FINANCIAL CORPORATION, Santa Ana, CA (US)

( * ) Notice: Subject to any disclaimer, the term of this patent is extended or adjusted under 35 U.S.C. 154(b) by 208 days.

(21) Appl. No.: 16/226,370

(22) Filed: Dec. 19, 2018

(51) Int. Cl.
| | |
|---|---|
| *G06K 9/00* | (2006.01) |
| *G06F 17/18* | (2006.01) |
| *G06K 9/62* | (2006.01) |
| *G06F 40/205* | (2020.01) |
| *G06F 40/289* | (2020.01) |

(52) U.S. Cl.
CPC ......... *G06K 9/00456* (2013.01); *G06F 17/18* (2013.01); *G06F 40/205* (2020.01); *G06F 40/289* (2020.01); *G06K 9/6215* (2013.01)

(58) Field of Classification Search
None
See application file for complete search history.

(56) References Cited

U.S. PATENT DOCUMENTS

| | | | |
|---|---|---|---|
| 7,366,705 B2 | 4/2008 | Zeng et al. | |
| 7,461,063 B1 | 12/2008 | Rios | |
| 9,069,798 B2 | 6/2015 | Hershey et al. | |
| 9,575,952 B2 | 2/2017 | Kumar Rangarajan Sridhar | |
| 10,628,834 B1* | 4/2020 | Agarwal | G06N 20/00 |
| 10,726,509 B1* | 7/2020 | Cannon | G06Q 30/0185 |
| 2002/0087389 A1* | 7/2002 | Sklarz | G06Q 30/02 |
| | | | 705/7.34 |

(Continued)

FOREIGN PATENT DOCUMENTS

| | | |
|---|---|---|
| CN | 105740349 | 7/2016 |
| CN | 106095996 | 11/2016 |
| CN | 107357899 | 11/2017 |

*Primary Examiner* — Kevin Ky

(74) *Attorney, Agent, or Firm* — Sheppard, Mullin, Richter & Hampton LLP

(57) ABSTRACT

Techniques are described for collecting descriptions of an entity from different data sources and using a numeric comparison and textual centrality measure to automatically select a best description. In one implementation, a method includes: retrieving a real property description dataset, the real property description dataset including descriptions from multiple data sources that describe the real property; extracting, from each of the descriptions, numbers that identify the property; performing a numerical comparison of the numbers extracted from each of the descriptions to determine if any descriptions needs to be discarded from further consideration; applying a text cleaning process to normalize the descriptions; and performing a textual centrality measure of remaining descriptions to determine a level agreement of each of the remaining descriptions with each of the other remaining descriptions; and using at least the textual centrality measure to select a description. The selected description may be used to populate a document.

20 Claims, 9 Drawing Sheets

(56) References Cited

U.S. PATENT DOCUMENTS

| | | | |
|---|---|---|---|
| 2006/0161592 A1* | 7/2006 | Ertoz | G06F 21/552 |
| 2008/0119167 A1* | 5/2008 | Rao | G06Q 30/02 |
| | | | 455/411 |
| 2010/0004952 A1* | 1/2010 | Serio | G06Q 40/08 |
| | | | 705/4 |
| 2012/0150753 A1* | 6/2012 | Collins | G06Q 30/0283 |
| | | | 705/306 |
| 2012/0278263 A1* | 11/2012 | Borthwick | G06N 5/025 |
| | | | 706/12 |
| 2012/0330611 A1* | 12/2012 | Libal | G06F 21/45 |
| | | | 702/179 |
| 2013/0103597 A1 | 4/2013 | Fout | |
| 2013/0132287 A1 | 5/2013 | Yao | |
| 2013/0317871 A1* | 11/2013 | Kulkarni | G06Q 10/063112 |
| | | | 705/7.14 |
| 2013/0332877 A1* | 12/2013 | Florance | G06Q 10/06 |
| | | | 715/781 |
| 2014/0164260 A1* | 6/2014 | Spieckerman | G06Q 30/0278 |
| | | | 705/306 |
| 2014/0304145 A1 | 10/2014 | Coon | |
| 2015/0332371 A1* | 11/2015 | Lomas | G06F 3/04842 |
| | | | 705/26.62 |
| 2017/0131106 A1* | 5/2017 | Dupey | G01C 21/32 |
| 2017/0352071 A1* | 12/2017 | Carey | H04L 12/2825 |
| 2018/0089300 A1* | 3/2018 | Ahuja | G06F 16/215 |
| 2018/0173681 A1* | 6/2018 | Dedhia | G06K 9/00456 |
| 2018/0268015 A1* | 9/2018 | Sugaberry | G06N 5/003 |
| 2018/0365529 A1* | 12/2018 | Duan | G06K 9/6274 |
| 2019/0050445 A1* | 2/2019 | Griffith | G06F 16/213 |
| 2019/0317932 A1* | 10/2019 | Flowers | G06F 16/93 |

\* cited by examiner

FIG. 4

TABLE 1

| type | predset | rn | wt |
|---|---|---|---|
| DI_FAST | simplesubdivision | c(5, 10, 50, 9) | 1 |
| FS | simplesubdivision | c(5, 10, 50, 9) | 1 |
| STARTER | simplesubdivision | c(5, 10, 50, 9) | 1.5 |
| OCR_2 | simplesubdivision | c(5, 10, 50, 9) | 0.5 |
| OCR_4 | simplesubdivision | c(5, 10, 50, 9) | 0.5 |

TABLE 2

| | | di_fast | fs | ocr_2 | ocr_4 | starter |
|---|---|---|---|---|---|---|
| Normalized Levenshtein distance between sources | di_fast | 0 | 0 | 0.356 | 0.356 | 0.356 |
| | fs | 0 | 0 | 0.356 | 0.356 | 0.356 |
| | ocr_2 | 0.356 | 0.356 | 0 | 0 | 0 |
| | ocr_4 | 0.356 | 0.356 | 0 | 0 | 0 |
| | starter | 0.356 | 0.356 | 0 | 0 | 0 |
| average distance to neighbor | | 0.267 | 0.267 | 0.178 | 0.178 | 0.178 |
| centrality score based on average distance and | | 73 | 73 | 64 | 64 | 88 |
| model picked source based on centrality score | | starter | | | | |
| raw confidence score of the group of legals | | 88 | | | | |
| enhanced confidence socre | | 91 | | | | |

FIG. 9

SYSTEM AND METHOD FOR AUTOMATED SELECTION OF BEST DESCRIPTION FROM DESCRIPTIONS EXTRACTED FROM A PLURALITY OF DATA SOURCES USING NUMERIC COMPARISON AND TEXTUAL CENTRALITY MEASURE

DESCRIPTION OF THE RELATED ART

The title insurance underwriting process has traditionally been a labor-intensive process. Large financial institutions that underwrite title insurance employ large numbers of title examiners, abstractors and searchers. These individuals research title histories and laws to determine the possibility of a defect in title to a parcel of land. The research frequently requires searching databases for evidence of title and applying business rules to the evidence to generate title products for customers.

Title insurance protects real estate purchasers and loan institutions from defects in title. A land purchaser may purchase title insurance to protect from an unknown claim on title. A home purchaser may be required to obtain title insurance prior to obtaining a mortgage on a property. Mortgagees and note purchasers may purchase title insurance to protect their collateral interest in a mortgage. Lien holders may also purchase title insurance to protect their collateral interest in the real estate owner's debt.

In the underwriting process, the databases searched for evidence of title may be fairly extensive. For example, county databases may be searched for the chain of title for the parcel of land or property. Public record databases may be searched for evidence of mortgages or liens on the parcel of land or property. Court databases may be searched for evidence of judgment liens. Proprietary databases may also be searched for histories of title insurance. Any database containing information for evaluating the risk associated with underwriting title insurance for the parcel of land may be searched.

The large amount of human effort required to generate a title product often results in significant delays or errors in the underwriting process. The title underwriter may have to search multiple databases for title evidence, compare the evidence with voluminous business rules, create a title report and generate a title insurance product. This may result in significant delays or errors in the acquisition of secured financing or in closing a real property transaction. The lengthy process also affects the sale of mortgages in secondary markets, decreases market liquidity and increases transaction time and cost.

BRIEF SUMMARY OF THE DISCLOSURE

In one embodiment, a method includes: retrieving an entity description dataset, the entity description dataset including a plurality of character strings describing the entity, each of the plurality of character strings collected from a respective one of a plurality of data sources; for each of the plurality of character strings, extracting numbers from the character string that identify the entity; performing a numerical comparison of the numbers extracted from each of the plurality of character strings to determine if one or more of the plurality of character strings needs to be discarded from further consideration, the numerical comparison comprising: determining if the numbers extracted from each of the plurality of character strings match with the numbers extracted from the other plurality of character strings; applying a text cleaning process to normalize for textual comparison the plurality of character strings; after performing the numerical comparison and applying the text cleaning process, performing a textual centrality measure of a remaining plurality of character strings to determine a level agreement of each of the remaining plurality of character strings with each of the other remaining plurality of character strings; and using at least the textual centrality measure to select a character string from the remaining plurality of character strings having a highest level of agreement with each of the other remaining plurality of character strings. In some implementations, the selected character string may be used to automatically populate a document.

In some implementations, the method further includes: calculating a confidence score of the selected character string, where the confidence score is calculated using at least the textual centrality measure. In such implementations, the method may further include: determining that the calculated confidence score falls above or below a predetermined threshold; and in response to determining that the calculated confidence score falls above or below a predetermined threshold, performing additional operations or presenting a notification to the user.

In some implementations, performing the textual centrality measure includes: calculating a levenshtein distance between each of the remaining plurality of character strings and each of the other remaining plurality of character strings.

In some implementations, the method further includes: for each of the plurality of character strings, concatenating into a number string the numbers extracted from the character string, where performing a numerical comparison of the numbers extracted from each of the plurality of character strings comprises: comparing the concatenated number strings.

In some implementations, the method further includes: classifying one or more of the plurality of character strings of the entity description dataset; and using at least the classification, determining whether or not to automatically select a character string from the plurality of character strings.

In some implementations, the entity is a real property, and the plurality of character strings of the dataset describe the real property. In such implementations, the numbers extracted from each of the plurality of character strings may include a lot number and a tract number. In such implementations, the method may further include: receiving a search query for the real property through a web-based application instance, where the web-based application instance retrieves the description dataset in response to the search query. In particular implementations, the web-based application instance may retrieve the description dataset by initiating a proxy call to each of the plurality of data sources for information related to the searched property. In some implementations, the selected character string may be used to populate a title document.

In some implementations, the method further includes: calculating a confidence score of the selected character string, where the confidence score is calculated using at least the textual centrality measure; and providing a web-based notification to a title examiner of the confidence score.

In one embodiment, a method includes: retrieving a real property description dataset, the real property description dataset including a plurality of descriptions describing the real property, each of the plurality of descriptions collected from a respective one of a plurality of data sources; for each of the plurality of descriptions, extracting numbers from the description that identify the real property; performing a numerical comparison of the numbers extracted from each of the plurality of descriptions to determine if one or more of the plurality of descriptions needs to be discarded from further consideration, the numerical comparison comprising: determining if the numbers extracted from each of the plurality of descriptions match numbers extracted from the other plurality of descriptions; applying a text cleaning process to normalize for textual comparison the plurality of descriptions; after applying the numerical comparison and text cleaning process, performing a textual centrality measure of a remaining plurality of descriptions to determine a level agreement of each of the remaining plurality of descriptions with each of the other remaining plurality of descriptions; and using at least the textual centrality measure to select a description from the remaining descriptions having a highest level of agreement with each of the other remaining plurality of descriptions.

In some implementations, the method further includes: receiving a search query for the real property through a web-based application instance, wherein the web-based application instance retrieves the description dataset in response to the search query. In some implementations, the web-based application instance retrieves the description dataset by initiating a proxy call to each of the plurality of data sources for information related to the searched real property.

In some implementations, the method further includes: calculating a confidence score of the selected description, wherein the confidence score is calculated using at least the textual centrality measure; and providing a web-based notification to a title examiner of the confidence score.

In some implementations, the method further includes: classifying one or more of the plurality of descriptions of the real property description dataset; using at least the classification, determining whether or not to automatically select a description from the plurality of descriptions to populate the title document; and populating a title document describing the real property with text of the selected description.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

FIG. 4 illustrates an example display of a set of descriptions of a property that may be retrieved from a plurality of different data sources, in accordance with implementations of the disclosure.

FIG. 9 illustrates a particular example numerical calculation of centrality scores, a raw confidence score, and enhanced confidence score to select a best description in accordance with implementations of the disclosure.

Figure 1:
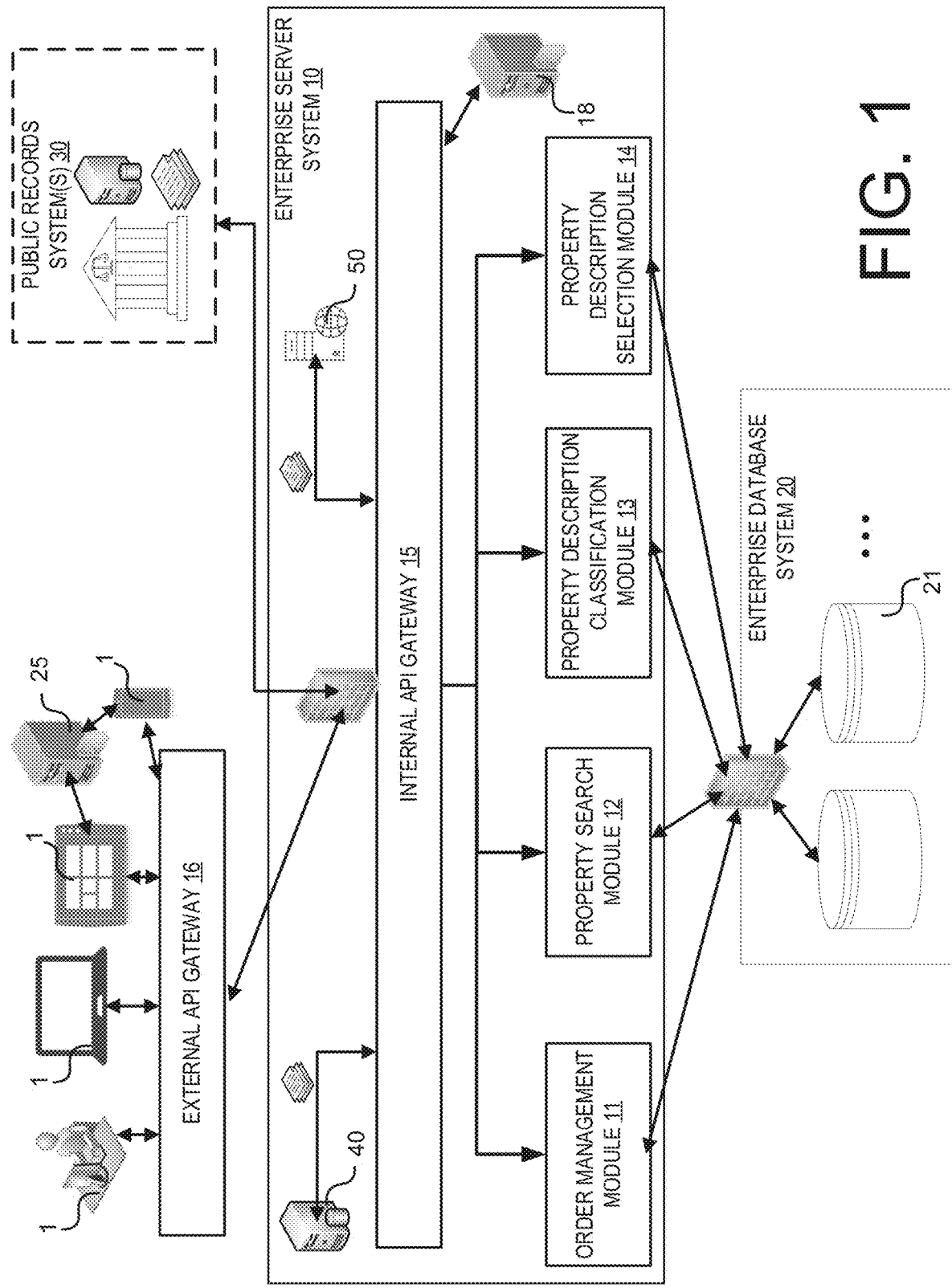
FIG. 1 illustrates an example system in which embodiments disclosed herein may be implemented.

The figures are not intended to be exhaustive or to limit various embodiments to the precise form disclosed. It should be understood that various embodiments can be practiced with modification and alteration.

DETAILED DESCRIPTION

Various embodiments described in the present disclosure are directed toward systems and methods for collecting descriptions of an entity (e.g., real property) from a plurality of different data sources and using a numeric comparison and textual centrality measure to automatically select a best description from the plurality of descriptions obtained from the plurality of different data sources.

Particular implementations are directed toward systems and methods for obtaining descriptions of a real property from a plurality of different data sources, running a numeric comparison of property-identifying numbers extracted from each of the descriptions to remove descriptions that do no match, and running a textual centrality measure to select a best property description from the plurality of descriptions. In various implementations, the output of the textual centrality measure may include the selected description, a confidence score of the selected description compared to the entire collection of potential descriptions, and a centrality measure determining the level of agreement of the selected description with the other descriptions from the other data sources.

The techniques described herein may be particularly advantageous in the field of title product creation in which the problem of determining with confidence a correct legal description among multiple legal descriptions for a property in question has conventionally required manual review, even when automated processes are used to provide an initial estimate of a legal description.

As used herein to refer to a real property, the terms "description" or "legal description" generally refer to a textual description (e.g., one or more paragraphs) describing the location and boundaries of a particular parcel of real estate in three-dimensional space upon the face of the earth. In some implementations, the primary parcel may be expanded by "together with" or similar language describing additional parcels of real estate and/or additional real property rights associated with the primary parcel. In other implementations, the primary parcel may be reduced by "less & except," "subject to" or similar language describing other parcels of real estate and/or real property rights that have been subtracted from the primary parcel. The textual description of where the property is located may include both numbers and words.

It should be noted that although various embodiments are described herein with respect to real estate-related documents, and particularly title documents containing legal descriptions, one having ordinary skill in the art reading this description would fully appreciate and understand that the various embodiments could be used with documents from other fields and industries not pertaining to real estate or title examination.

FIG. 1 illustrates an example system in which embodiments disclosed herein may be implemented. The system includes enterprise server system 10, enterprise database system 20, public records system 30, external API gateway 16, and web application proxy server 25. In implementations, some or all components of systems 10 and 20, external API gateway 16, and web application proxy server 25 may be implemented as a part of a single enterprise system. For example, data retrieval and communication may be performed along a common enterprise service bus or enterprise network.

In this particular implementation, enterprise server system 10 provides a plurality of web-based applications or modules 11-14 through internal application program interface (API) gateway 15. Modules 11-14, in various embodiments, further described below, may be used to access property records from a plurality of different data sources, index property records, search property records, generate reports (e.g., title reports) using property records, classify descriptions of properties contained in the records, and automatically select a best description of a property from a multitude of descriptions contained in a plurality of different data sources. For example, tract map records, grant deeds, deeds of trust, tax records, loan documents, title insurance policies, title reports, and other property records may be accessed.

Indexed property records may be stored in one or more databases 21 of database system 20. For example, property data of a property record may be indexed using one or more fields (e.g., a date field, a document type field, an address field, an APN field, etc.) and associated with a property record that is stored in database system 20 or a file server (e.g., in an image format or in a text-based format). The association between the property data and a property record may be made with a pointer. For example, key-value pairs (KVP) may be used to establish a link between property data and a property record based on a document number, a year, a state, a county, property tax identifiers, and legal descriptions such as the tract map recording information, lot number, etc.

In various embodiments, property records may be obtained from a plurality of different data sources. For example, property records may be obtained from enterprise legacy systems without web services 40, enterprise electronics systems with web services 50, and public records system(s) 30 such as county recorder offices that include physical property records and/or digital property records stored on a local system. Physical property records may be digitized (e.g., using a scanner), imaged documents may be OCR'ed to make them text-searchable, and the documents may be tokenized and indexed.

By way of illustrative example, in the title industry, where the retrieved digital documents are real-estate-related documents, the data sources may include web-based application servers of title companies, legacy application servers of title companies, title plants, or county recorders. In this example implementation, legacy application servers may comprise legacy title escrow systems (e.g., systems that store real-estate-related documents in word perfect form) and web-based application servers may comprise transactional title or escrow systems that generate title commitments or policies that another system may interact with via a web service.

An external API gateway 16 may provide a network access point to enterprise server system 10 for user devices 1 accessing modules 11-14 provided by internal API gateway 15. By way of example, user devices 1 may comprise a desktop system, a laptop, a tablet, a mobile phone, or any other system that may display and access applications (e.g., web-based applications) provided by enterprise system 10. In particular, user devices 1 may access an application for creating title products such as title reports. The application may be provided as a browser based web application (e.g., instructions contained in a webpage), a mobile application (e.g., client program installed on device directly connects with API gateway 15), as a native-based application, or some combination thereof. The application may be accessed using a variety of frameworks, such as, for example, HTML 5, Angular JS, ASP.NET, WPF, MVVM, etc. In the example system of FIG. 1, a tablet or smartphone device may execute an application that calls a web application proxy server 25 for accessing modules 11-14.

In implementations, internal API gateway 15 may filter user traffic so that only authenticated or authorized users access modules 11-14, route requests by user devices to an appropriate module 11-14, provide an API tailored for each type of device so that the device may access a module, limit how much traffic may be sent by each external user device, and provide other gateway services. Alternatively, in other embodiments an API gateway is not implemented and user devices may directly call modules 11-14 using the appropriate protocols (e.g., HTTP, WebSocket, etc.) Enterprise server system 10 may also provide a security server 18 (e.g., an Active Director Federation Services (ADFS) server) for providing users with sign-on access (e.g., user credentials) to applications provided by server system 10.

As illustrated in this example, modules 11-14 include an order management module 11, a property search module 12, a property description classification module 13, and a property description selection module 14. In embodiments, these modules may be implemented as separate or integrated web-based applications. Order management module 11 may initiate orders for title products such as title policies or reports for a property. Property search module 12 may be used to perform a search of records of one or more properties from a plurality of different data sources. For example, a property address or assessor's parcel number (APN) may be entered into a search platform and relevant property data may be retrieved from a plurality of different data sources, including sources that provide OCR'ed documents, prior title polices or reports, and the like.

Property description classification module 13, further described below, may classify a description of a real property based on its text. Based on the classification of the description, it may be determined whether automated methods of description selection may be implemented. Property description selection module 14, further described below, may be to use a numeric comparison and textual centrality measure to automatically select a best description of a property from a plurality of descriptions obtained from a plurality of different data sources.

Figure 2:
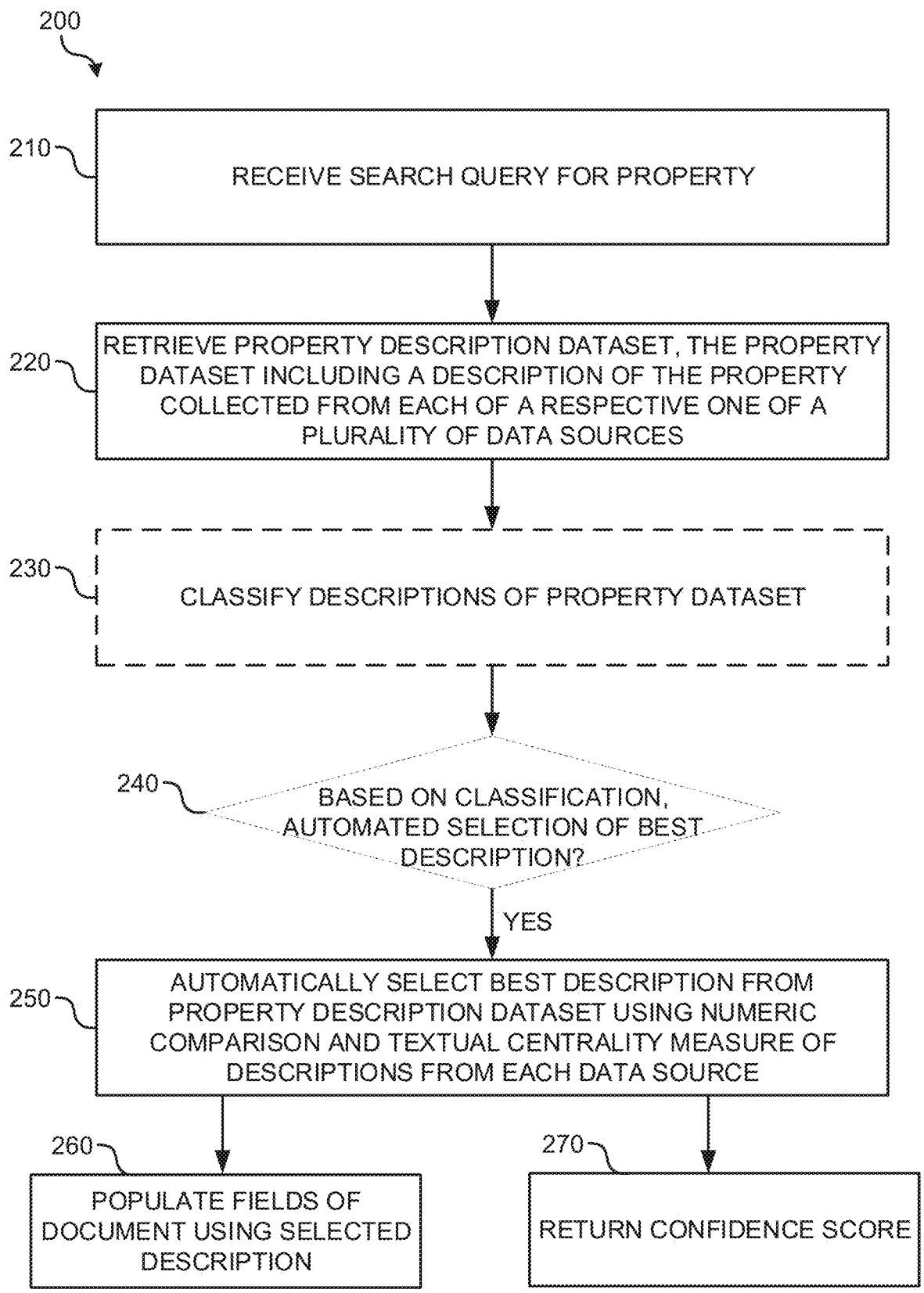
FIG. 2 is an operational flow diagram illustrating an example method that may be implemented to generate title products, in accordance with implementations of the disclosure.

FIG. 2 is an operational flow diagram illustrating an example method 200 that may be implemented to generate title products (e.g., title report or title policy) in accordance with implementations of the disclosure. For example, method 200 may be implemented to generate a title policy when a new order comes in (e.g., because of a transfer of real property ownership).

Method 200 may be implemented by one or more processors executing instructions stored on one or more computer readable mediums. For example, method 200 may be implemented using at least modules 11-14 of enterprise server system 10. In some implementations, prior to implementing method 200, a web-based application (e.g., an application hosted by an application server) for title product generation be initialized.

At operation 210, a search query for a property is received. For example, property identification information may be entered by a title examiner into a search platform/engine. In some instances, the property identification information may include a property address or APN.

At operation 220, a description dataset of the searched property is received, the dataset including a description of the property collected from each of a respective one of a plurality of data sources. For example, in response to searching for information pertaining to a property in question, documents and other information relating to the property may be retrieved from a plurality of data sources or systems. The retrieved information may contain descriptions of the same property collected from a plurality of different data sources such as title plants, public records (e.g., county recorders, title companies, etc.).

Figure 4:
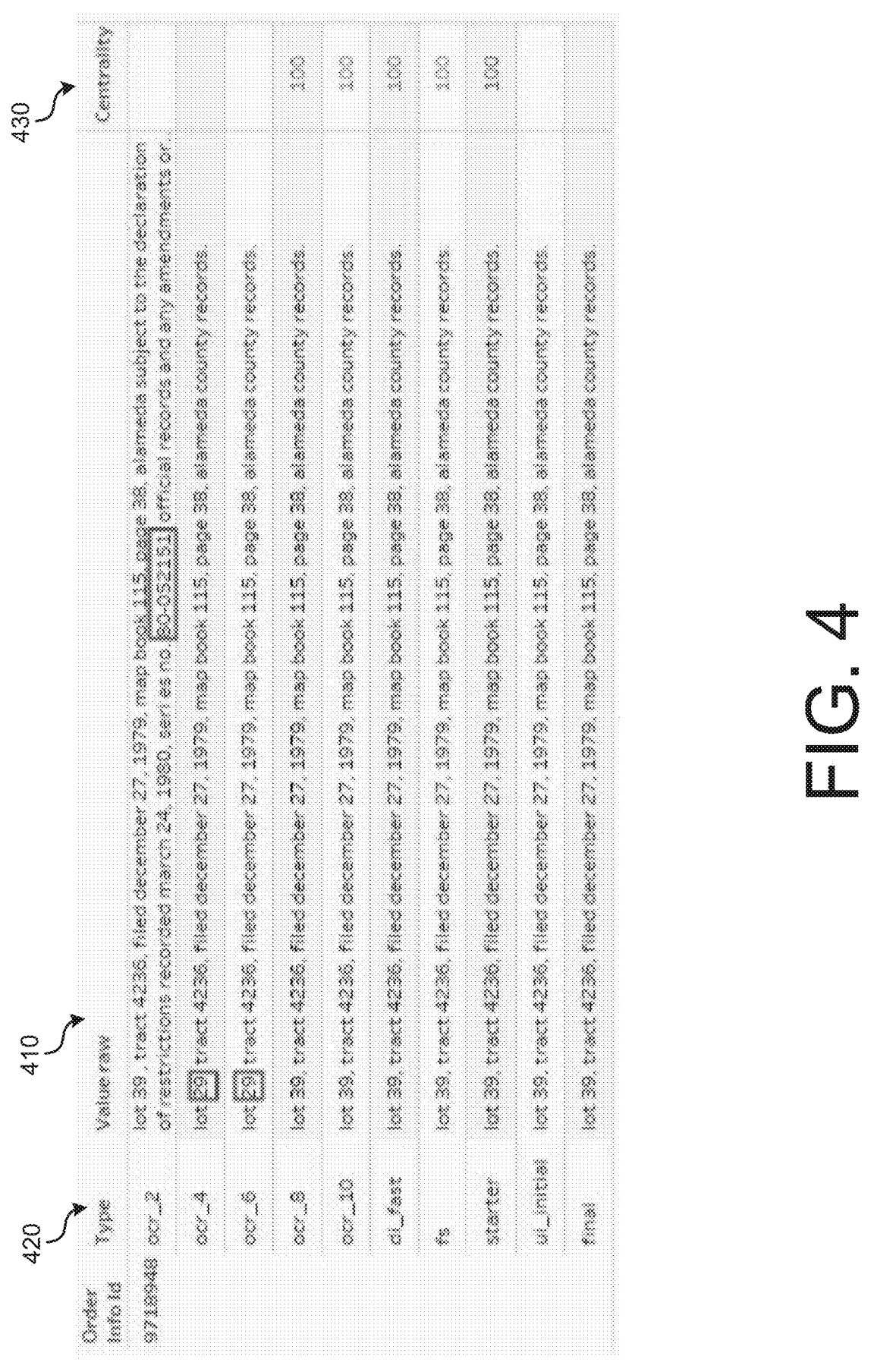

In some implementations, property information, including property descriptions, may be retrieved from each of the plurality of different sources by initiating a proxy call to each of the external systems associated with each of the plurality of systems. The proxy calls may be initiated through a search engine of a web application through which the title examiner searches for property information. By way of example, a prior title product (e.g., a historical report) for the property in question (e.g., a "starter" document that may be used to generate a title product may be retrieved by initiating a proxy call to an existing title orders system. As another example, OCR'ed documents obtained from public records, and associated with the property in question, may be retrieved by making a proxy call to a system that stores such records. In other implementations, the functionalities of the systems from which property information is retrieved may be directly implemented in the web application, FIG. 4 illustrates an example display of a set of descriptions of a property that may be retrieved from a plurality of different data sources, in accordance with implementations. As shown, the display identifies the source type 410 of the description and raw value 420 of the description. The raw value may have a character string data type or other suitable data type. In this example, the various data sources of the property description may include various OCR'ed data sources (e.g., "ocr_2," "ocr_4," "ocr_6," "ocr_8," and "ocr_10"), starter document data sources (e.g., "starter", "fs"), examiner keyed data sources (e.g. FAST), the initial legal description identified through automated rules and displayed in the examiner's user interface (e.g. ui_initial) and the legal description placed on the final title policy (e.g. final).

Following retrieval of the descriptions, at optional operation 230, the retrieved descriptions may be classified (e.g., using property description classification module 13). The ability to classify or categorize the retrieved descriptions may be advantageous, as depending on the complexity of the description, there may be different associated levels of risk for the title company creating a title product (e.g., title policy). Depending on the categorization of a description (which has a corresponding level of risk), this may be used to inform whether automated selection of the description of the property at issue is appropriate (optional decision 240).

By way of illustrative example, in instances where a property description is classified as including any "less & except" language, the property description may be removed from an automated process of selecting a best property description among the set of retrieved descriptions because these "less & except" provisions may pose risks in the ability to underwrite ownership rights effectively. Further, in instances where a property description is classified as including any "together with" language, the property description may be removed from an automated process of selecting a best property description among the set of retrieved descriptions because these "together with" provisions may pose other risks in the ability to underwrite ownership rights effectively. More generally, any descriptions i) having a classification indicating a high complexity of the overall description that is to be selected, and/or ii) indicating an increased risk associated with selecting the incorrect description may result in the system determining that the description needs to be reviewed manually. In some implementations, if any of the descriptions retrieved at operation 220 are classified at operation 230 as being inappropriate for automated review, at decision 240 it may be determined that operation 300 is to be skipped, and that a manual review is to be conducted of the descriptions. In other implementations, only those descriptions that are classified as being inappropriate for automated review are removed from automated consideration.

In one particular example involving real property classification, descriptions may be classified in accordance with Table 1, below:

TABLE 1

| Label | Description Characteristics |
|---|---|
| Simple subdivision | Description consists of lot number, subdivision name or number, and book and page numbers. Description includes neither "less & except" provisions, nor any "together with" provisions. |
| Mid-level subdivision | Description includes lot number, subdivision name or number, and book and page numbers. Description includes one or more of the following: 'reserve or exclude' rights to underground resources, multiple lots in the same subdivision, second parcel with a road for access to property, or references back to older maps or original sectional information |

TABLE 1-continued

| Label | Description Characteristics |
| --- | --- |
| Complex subdivision | Description associated with condominium or similar common-interest development regime |
| Metes and bounds | Description includes specific geographic map measures defining parcel boundaries by specific calls and directions beginning at a fixed point. Description may contain subdivision lots. |
| Sectional | Description includes references to the section, township, and range coordinates. |

In this example, descriptions that are labeled as corresponding to a "simple subdivision" may be passed to an automated description selection process whereas descriptions that are labeled as "mid-level subdivision" may not be passed to the automated description selection process. It should be appreciated that, depending on the implementation, other classification labels, and a different number of classifications may be used. Moreover, it should be appreciated that the characteristics of a description that may lead to different classifications may vary depending upon the implementation. Furthermore, it should be appreciated that the determination of what description classifications should preclude automated selection of a best description among a plurality of retrieved descriptions may vary depending upon the implementation.

Referring again to method 200, at operation/method 250, a best description from the property description dataset is automatically selected using a numeric comparison and textual centrality measure of the descriptions retrieved from the plurality of data sources. In particular, a description may be selected as the best description if: i) it has numeric identifiers of where a property is located (e.g., lot and tract number) that match the majority of retrieved descriptions; and ii) has the highest level of agreement with the other descriptions based on a centrality measure. Particular implementations of operation 250 are further described below with reference to FIG. 3.

As noted above, in some implementations operation 250 is performed only if the classification of the descriptions provide an indication that automated selection of the best description is suitable for the class of description. In other implementations, operation 250 may be always performed, regardless of the description classification, or in instances where there is no classification of the retrieved descriptions.

Following selection of a best description, at operation 260, one or more fields of a title product (e.g., title policy) may be populated using the selected description, an automated workflow may be triggered, and/or notifications may be presented to the user (e.g., notifications to perform manual operations). Additionally, at operation 270, a confidence score indicating a confidence of the selected description may be obtained. Depending on whether the confidence score falls above or below a predetermined threshold, different processing operations may be automatically triggered and/or different prompts/notifications may be displayed to the user. For example, if the confidence score falls below a predetermined threshold, the title examiner may be instructed via a display notification to perform a manual review of the populated description fields, and/or a graphical user interface for manual review of the populated description fields may be presented to the title examiner. Alternatively, if the confidence score meets or exceeds a threshold, the system may not instruct the title examiner to perform a manual review, and/or an automated workflow may be triggered. In some implementations, the one or more fields of the title product are populated using the selected description only if it exceeds the predetermined threshold.

Figure 3:
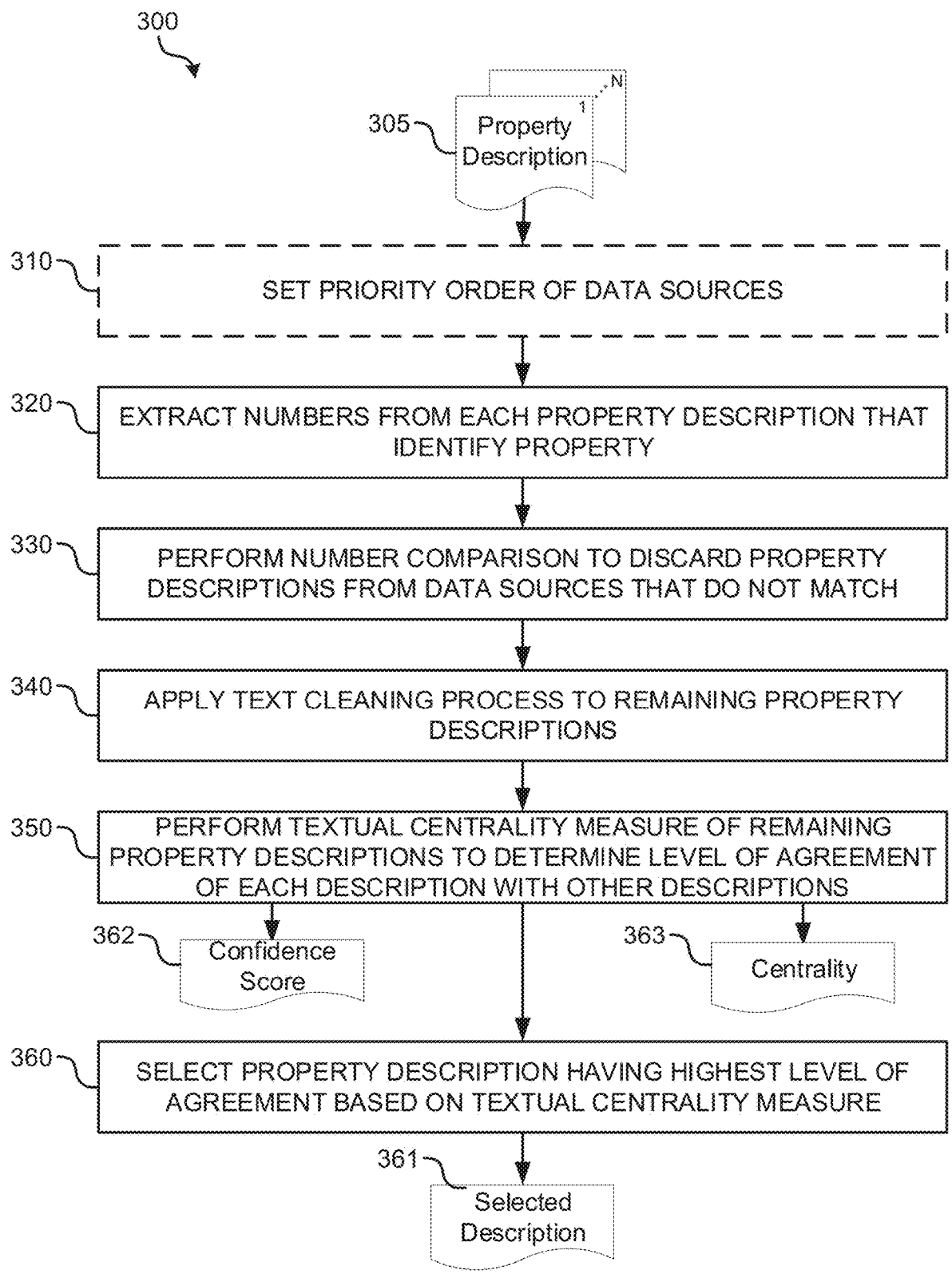
FIG. 3 is an operational flow diagram illustrating an example method that may be implemented to automatically select a best description from a retrieved property description dataset using a numeric comparison and textual centrality measure of the descriptions retrieved from a plurality of data sources, in accordance with implementations of the disclosure.

FIG. 3 is an operational flow diagram illustrating an example method 300 that may be implemented to automatically select a best description from a retrieved property description dataset using a numeric comparison and textual centrality measure of the descriptions retrieved from the plurality of data sources, in accordance with implementations of the disclosure. For example, method 300 may be implemented to select a best property description during the process of title policy generation.

Method 300 may be implemented by one or more processors executing instructions stored on one or more computer readable mediums. For example, method 300 may be implemented using one or more modules, including property description selection module 14, of enterprise server system 10.

As illustrated and further described below, method 300 may take as an input a plurality of retrieved property descriptions 305 and output: i) a selected description 361; ii) a confidence score of the selected description 362; and iii) a centrality measure 363 of the selected description. By way of illustrative example, the property descriptions 305 may be retrieved in accordance with operations 210-220 of method 200, described above. For example, the property descriptions 305 may correspond to the set of descriptions illustrated in FIG. 4 and described above.

At optional operation 310, a priority order of data sources used to retrieve property descriptions may be set. For example, a title examiner may be provided with a user interface to select the priority order of data sources. In some implementations, the priority order may be used to select the best description when two or more descriptions have an equal measure of centrality. In some implementations, operation 310 may be performed prior to performing method 300. In some implementations, instead of performing operation 310, a default order of priority among a plurality of data sources may be programmatically configured.

At operation 320, for each of the retrieved property descriptions, numbers (e.g., lot number, block number, tract number, book number, page number) are extracted that identify the property. In some implementations, the extracted numbers for each description may be concatenated into a number string or some other data type that allows direct comparison of each number with the extracted numbers of another description. In various implementations, the retrieved property descriptions may be standardized in a particular format that facilitates numerical extraction. For instance, as shown in the particular example of FIG. 4, each of the retrieved description values may include a lot number, tract number, and other information in the same order.

At operation 330, a number comparison is performed of the extracted numbers for each description (e.g., extracted number strings) to discard from consideration property descriptions from data sources that do not match. For example, in some implementations, the most common extracted number string (i.e., the statistical mode) is set as the correct number string, and descriptions that do not contain this number string are removed from consideration. In some implementations, if less than a threshold number of sources contain the most common number string (e.g., less than 50%), then method 300 may terminate, and the process of description selection may revert to manual review. In some implementations, if there is more than one mode among the extracted number strings, the process of description selection may revert to manual review.

Figure 5:
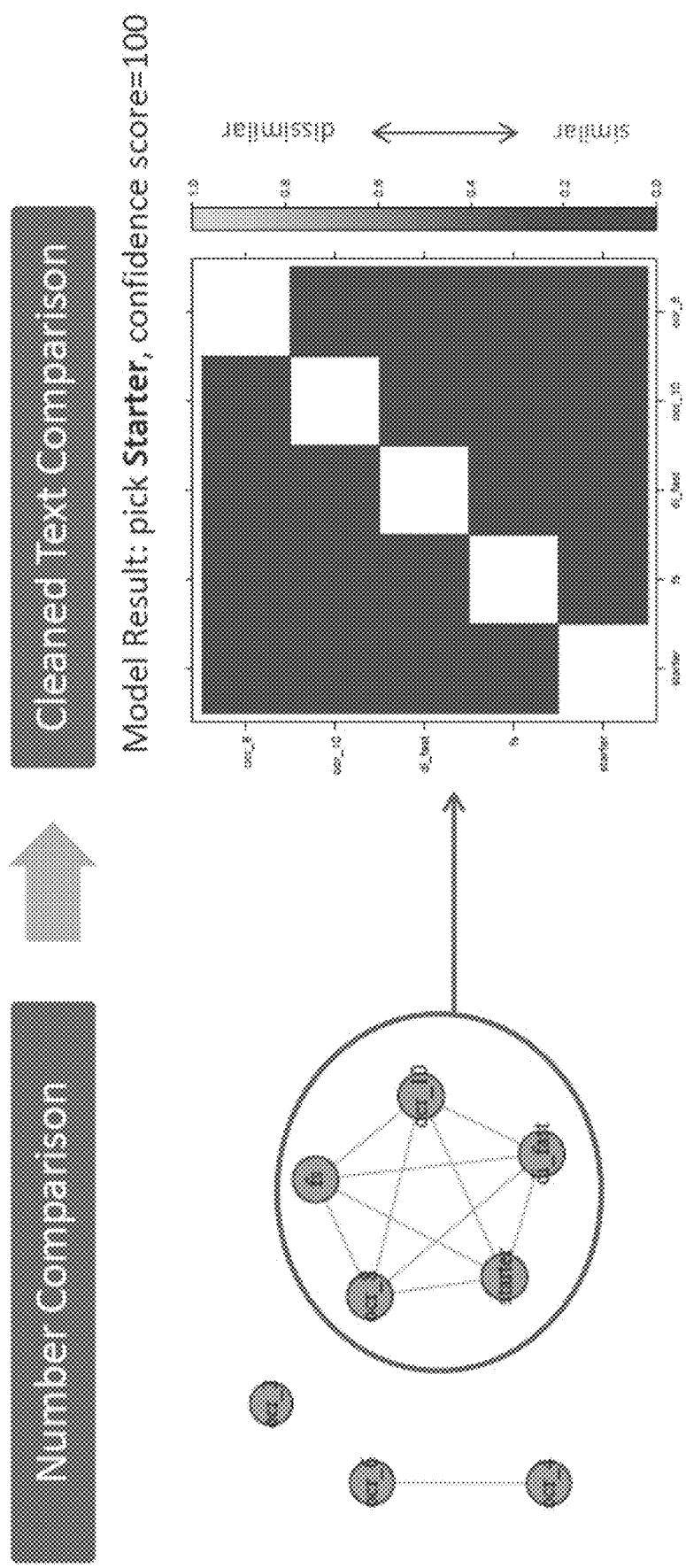
FIG. 5 provides a pictorial illustration of the number comparison process and textual centrality measure process of the method of FIG. 3.

As illustrated in the example of FIG. 4, the extracted numbers of the ocr_4 (different lot number), ocr_4 (different lot number), and ocr_2 (additional series no.) sources do not match the remaining sources. As such, as a result of the numeric comparison, the descriptions from ocr_2, ocr_4, and ocr_6 are removed from consideration as a best description. This is illustrated in the example of FIG. 5, which provides a pictorial illustration of the number comparison process of method 300.

In particular implementations, the numeric comparison may be performed in multiple stages or comparisons. For example, in the case of real property descriptions, book and page numbers may be compared before comparing tract and lot numbers. In this manner, the real property descriptions that do not match other descriptions during the initial numeric comparison may be discarded from further consideration.

As property descriptions retrieved from different data sources generally following a standardized format whereby a single difference in number (e.g., lot number or tract number) provides a strong indication that the description belongs to a different property, the numeric comparison of operation 330 may provide an accurate means of removing inapplicable descriptions from consideration. In particular, a textual centrality or comparison measure, by itself, may not place much weight on a single number character difference, even though in the title industry there may be a significant difference when property descriptions have a different lot number, tract number, etc. As such, by virtue of first performing a numeric comparison, the appropriate amount of weight may be placed on the difference in numbers among property descriptions, and the accuracy of method 300 may be significantly enhanced.

At operation 340, a text cleaning process may be applied to the property descriptions to normalize the descriptions for comparison. Depending on the implementation, the text cleaning process may be performed after or before numeric comparison (operation 330). The text cleaning process may be applied to the remaining property descriptions with the numbers extracted or with the remaining property descriptions including the numbers. In various implementations, the text cleaning process may apply a natural language processing algorithm or other suitable algorithm to normalize the text of the remaining descriptions for comparison. For example, the text cleaning process may include making all characters the same case, removing spaces, removing punctuation, removing stop words (e.g., "a," "and," "the"), performing lemmatization, etc.

At operation 350, after text cleaning, a textual centrality measure 363 of the remaining property descriptions is calculated to a determine a level of agreement of each description with other descriptions. In some implementations, to measure a similarity of the text strings of the remaining descriptions, for each of the text strings, a Levenshtein distance, or variants thereof, between the text string and each of the other text strings may be determined. In other implementations, other similarity measurements between text such as a Euclidean distance measurement, or a Jaccard similarity measurement may be used.

In some implementations, a confidence score 362 may be determined at operation 350 based on the degree of spread in agreement between the different descriptions.

As illustrated in the example of FIG. 4, as the remaining descriptions after numeric comparison are all identical, the centrality measure 430 returns a value of 100. This is further illustrated in the example of FIG. 5, which provides a pictorial illustration of the textual centrality measure process of method 300.

At operation 360, the property description having the highest level of agreement with the other property descriptions based on the textual centrality measure is selected. In implementations where there are multiple "best" descriptions, a description may be selected based on a hierarchy of the different data sources (e.g., as specified during operation 310).

A selected property description 361 may be used to auto-populate fields of a title document. In implementations, the confidence score 362 and/or centrality measure 363 output by method 300 may be used to determine whether manual review of the selected description is needed. For example, if a determination is made based on the confidence score that manual review is needed, a web-based application for title document creation may provide a flag or other visual indication to the title examiner. Alternatively, if manual review is not required, the application may also provide a visual indication, or it may provide no indication at all.

In some particular examples, a textual centrality measure 363 and confidence score 362 may be calculated as follows. Assume there are n sources of a description (e.g., a property description) where all numbers agree (e.g., as determined by operation 340). For the cleaned textual string corresponding to each source i, a pairwise, normalized Levenshtein distance may calculated for the other strings. The Levenshtein distance may be computed as a measure of the dissimilarity between two strings, where the distance may be based on a number of deletions, insertions, or substitutions required to transform one string into another string. It may be normalized by dividing the character number of the longer string.

After calculating each pairwise Levenshtein distance for each source i, an average Levenshtein distance to all neighbors (i.e., the other source descriptions) may be calculated for each source by taking the average of the pairwise Levenshtein distances for the source i. Thereafter, a centrality measure $C_i$ for each source i may derived based on Equation (1), below:

$$C_i = 100 * \left(1 - \frac{d_i}{wt_i}\right) \qquad (1)$$

Where $d_i$ is the average Levenshtein distance for the source and $wt_i$ is a weight assigned to the source, which may be user configurable. Additionally, a raw confidence score RCS may be calculated based on Equation (2), below:

$$RCS = 100 * \left(1 - \sqrt{\sum_{i=1}^{n} \frac{d_i^2}{(n-1)^2}}\right) \qquad (2)$$

Where in this example, the confidence score is calculated based on a standard deviation from the mean zero.

In some implementations, an enhanced confidence score may be derived by performing a logistic regression that takes into account the raw confidence score, and other characteristics such as the classification type of the descriptions, the source count, a transaction type, etc.

FIG. 9 illustrates a particular example numerical calculation of centrality scores, a raw confidence score, and enhanced confidence score using the aforementioned mathematical examples to select a best description in accordance with implementations of the disclosure. As illustrated by Table 1 of FIG. 9, property descriptions from five different sources are selected for comparison. The selected descriptions have been classified as corresponding to a "simple subdivision," indicating that they are suitable for automatic description selection. Additionally, the selected descriptions have been assigned a weight based on the source type. In particular, OCR'ed data sources (e.g., "ocr_2," "ocr_4,") have been assigned the lowest weight, while starter document data sources (e.g., "starter", "fs"), and examiner keyed data sources (e.g. FAST) have been assigned higher weights.

As illustrated by Table 2 of FIG. 9, a normalized Levenshtein distance was calculated between each pair of sources, an average Levenshtein distance to the four other sources was computed for each source, and a centrality score was computed for each source based on its calculated average Levenshtein distance and assigned weight. In this example, the "starter" source has the highest centrality score. Additionally, a raw confidence score and enhanced confidence score were calculated for the dataset.

Experimental Results

Figure 6:
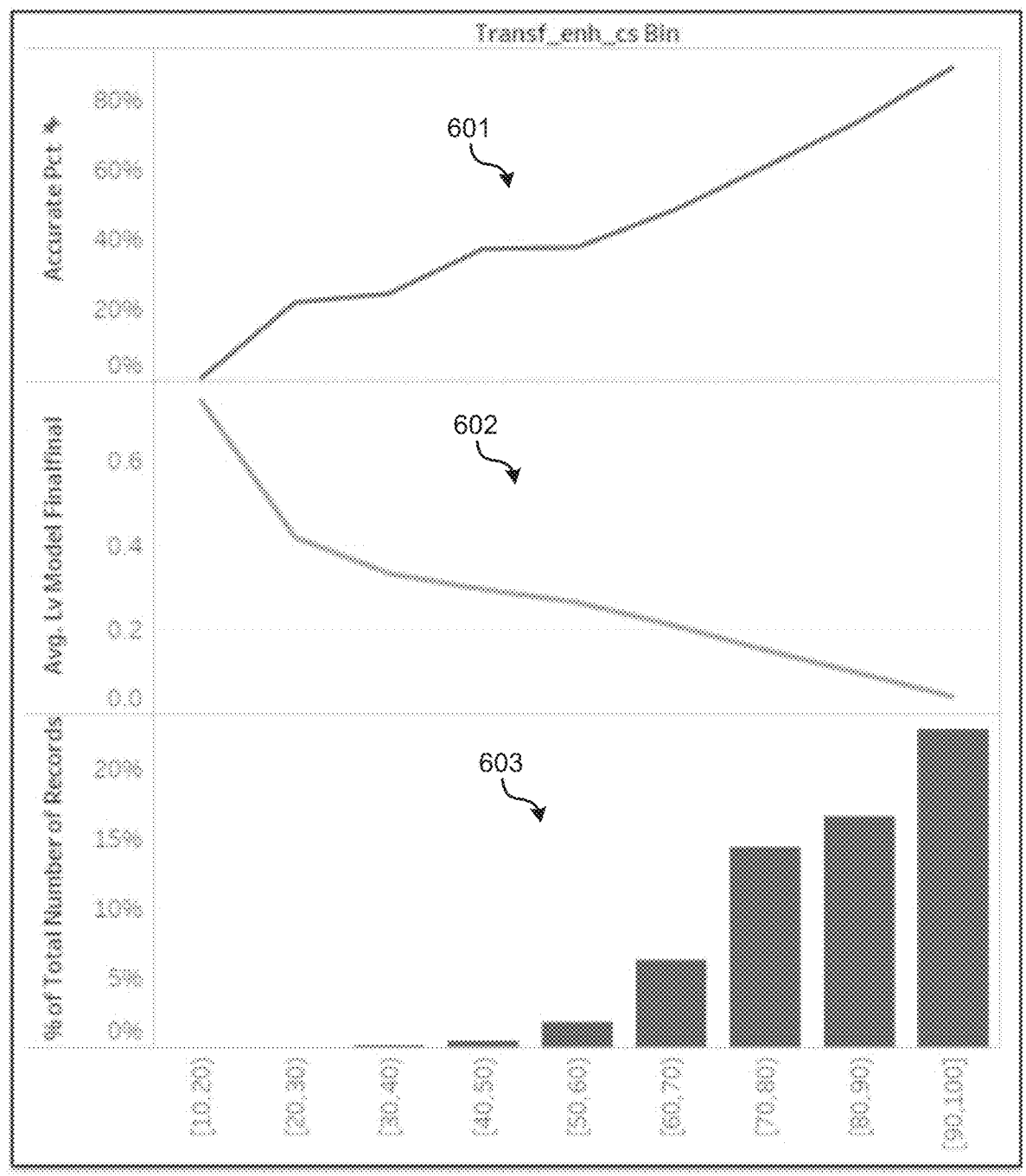
FIG. 6 shows plots illustrating the performance of systems and methods implemented in accordance with the disclosure to automatically select a best description from a retrieved property description dataset using a numeric comparison and textual centrality measure of the descriptions retrieved from the plurality of data sources.

FIG. 6 shows plots illustrating the performance of systems and methods implemented in accordance with the disclosure to automatically select a best description from a retrieved property description dataset using a numeric comparison and textual centrality measure of the descriptions retrieved from the plurality of data sources. Plot 601 illustrates an automatic selection accuracy percentage (y axis) as a function of the confidence score bin of a selected description shown in plot 603. Here, an "accurate" selection is defined as a selection having a levenshtein distance of less than 0.1 between legal descriptions automatically selected by the methods described herein and final legal descriptions as selected by title examiners. An "inaccurate" selection is defined as a selection of having a levenshtein distance of 0.1 or greater. As illustrated, the "accurate percentage" as defined by levenshtein distance correlates strongly with the confidence score of the selected description.

Plot 602 illustrates an average levenshtein distance (y axis) as a function of the confidence score bin of a selected description shown in plot 603. Here, the average levenshtein distance is defined as the average levenshtein distance between legal descriptions automatically selected by the methods described herein and final legal descriptions as selected by title examiners. As illustrated, a decrease in the average levenshtein distance correlates strongly with an increase in the confidence score of the selected description. In the 90-100% confidence score range, the average levenshtein distance is less than 0.1.

Plot 603 illustrates a non-cumulative frequency distribution of the of property records as a function of binned confidence scores representing a confidence range of a selected description. As illustrated, more than 90% of records were determined to have a confidence score of 70% or higher.

Figure 7A:
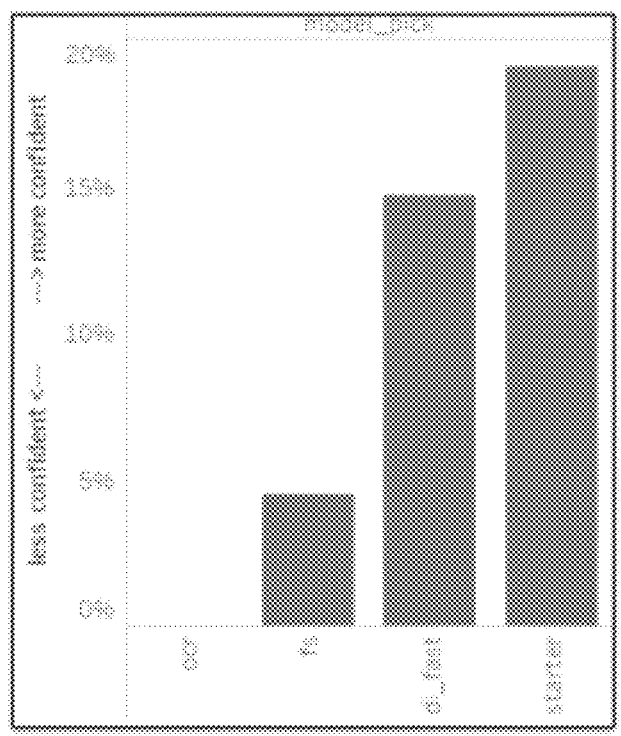
FIG. 7A is a plot illustrating the performance of implementations of the automated description selection method described herein as a function of the data source from which a description was selected.

FIG. 7A is a plot illustrating the performance of implementations of the automated description selection method described herein as a function of the data source from which a description was selected. As illustrated, when descriptions were automatically selected from a starter document, they had on average the highest confidence score. When descriptions were automatically selected from OCR'ed documents, they had on average the lowest confidence score.

Figure 7B:
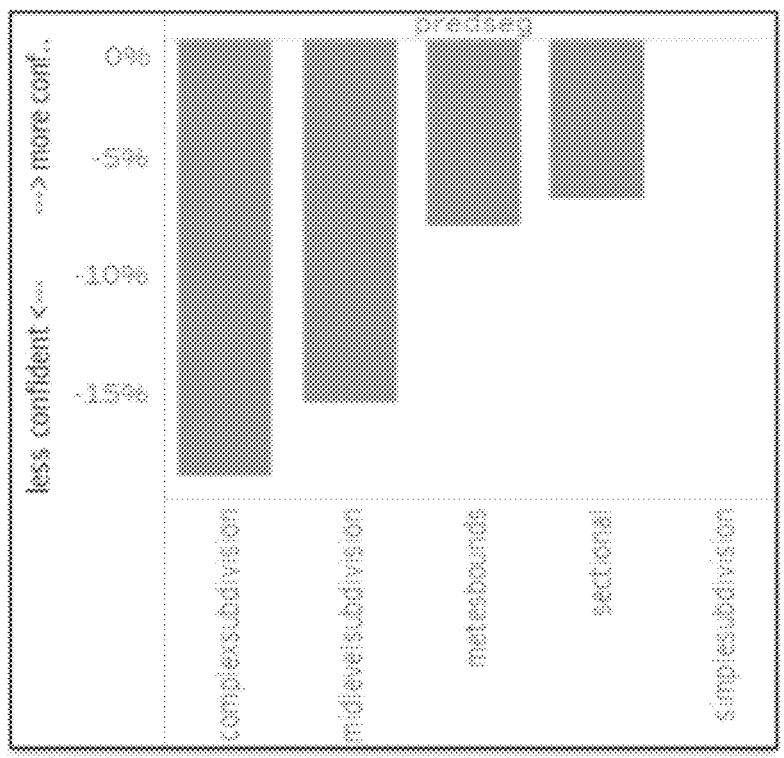
FIG. 7B is a plot illustrating the performance of implementations of the automated description selection method described herein as a function of the classification of the description, where the classifications described above with reference to Table 1 were used.

FIG. 7B is a plot illustrating the performance of implementations of the automated description selection method described herein as a function of the classification of the description, where the classifications described above with reference to Table 1 were used. As illustrated, when descriptions were classified as a "simple subdivision," the confidence score of the automatically selected description was on average highest, whereas when descriptions were classified as a "complex subdivision," the confidence score of the automatically selected description was on average lowest.

As used herein, the term module might describe a given unit of functionality that can be performed in accordance with one or more implementations of the present application. As used herein, a module might be implemented utilizing any form of hardware, software, or a combination thereof. For example, one or more processors, controllers, FPGAs, CPUs, GPUs, ASICs, PLAs, PALs, CPLDs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software modules are used to implement such features or functionality.

Figure 8:
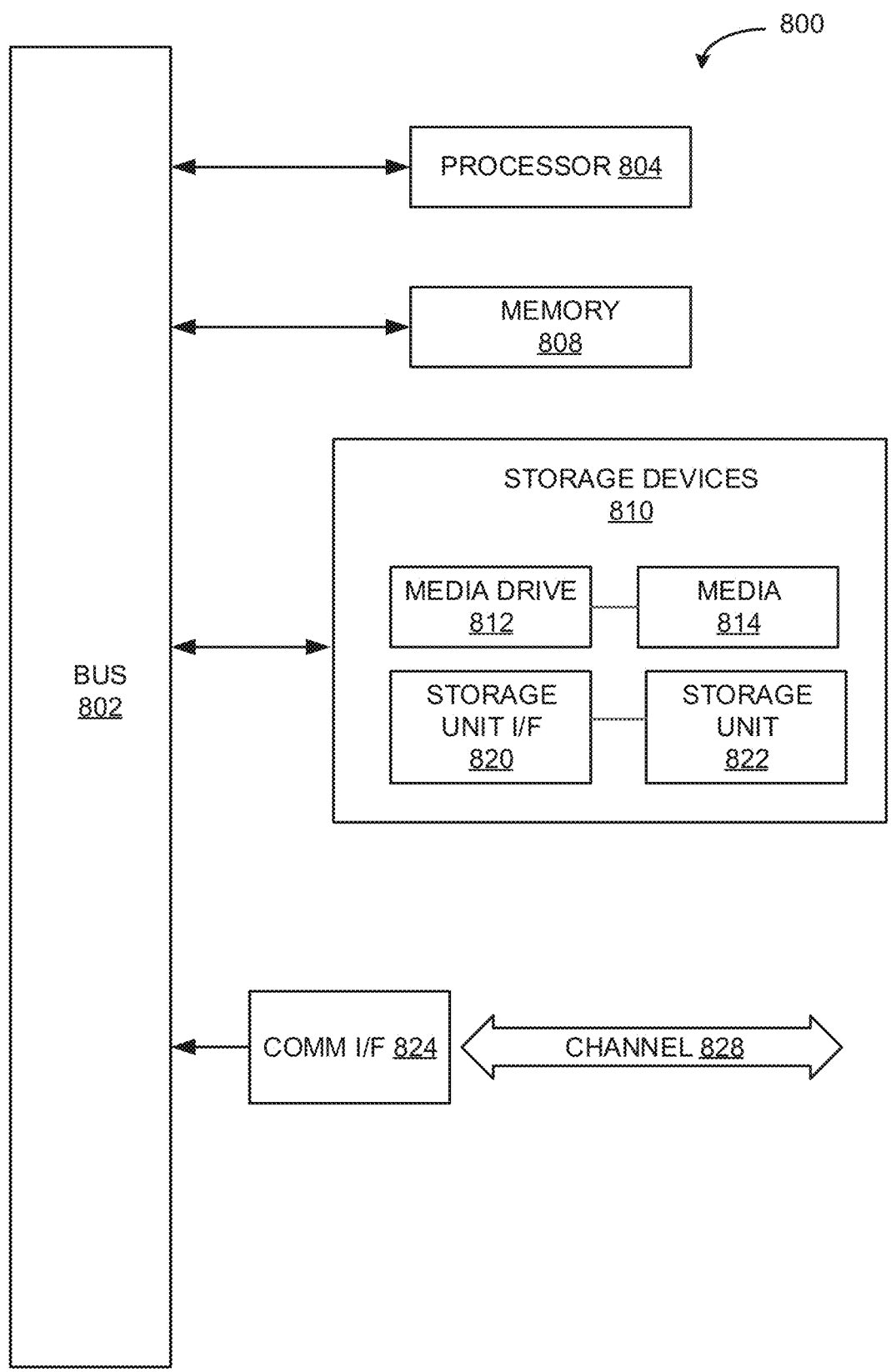
FIG. 8 illustrates an example computing module that may be used to implement various features of the methods disclosed herein.

FIG. 8 illustrates an example computing module 800 that may be used to implement various features of the methods disclosed herein. Computing module 800 may represent, for example, computing or processing capabilities found within imaging devices; desktops and laptops; hand-held computing devices (tablets, smartphones, etc.); mainframes, supercomputers, workstations or servers; or any other type of special-purpose or general-purpose computing devices as may be desirable or appropriate for a given application or environment. Computing module 800 might also represent computing capabilities embedded within or otherwise available to a given device. As used herein, the term "computing device" may refer to hardware of a computing module.

Computing module 800 might include, for example, one or more processors, controllers, control components, or other processing devices, such as a processor 804. Processor 804 might be implemented using a general-purpose or special-purpose processing engine such as, for example, a microprocessor, controller, or other control logic. Processor 804 may be a type of computing device. In the illustrated example, processor 804 is connected to a bus 802, although any communication medium can be used to facilitate interaction with other modules of computing module 800 or to communicate externally.

Computing module 800 might also include one or more memory modules, simply referred to herein as main memory 808. For example, preferably random access memory (RAM) or other dynamic memory, might be used for storing information and instructions to be executed by processor 804. Main memory 808 might also be used for storing temporary variables or other intermediate information during execution of instructions to be executed by processor 804. Computing module 800 might likewise include a read only memory ("ROM") or other static storage device coupled to bus 802 for storing static information and instructions for processor 804.

The computing module 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid state drive, an optical disk drive, a CD, DVD, or BLU-RAY drive (R or RW), or other removable or fixed media drive might be provided. Accordingly, storage media 814 might include, for example, a hard disk, a solid state drive, cartridge, optical disk, a CD, a DVD, a BLU-RAY, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing module 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory module) and memory slot, a PCMCIA slot and card, and other fixed or removable storage units 822 and interfaces 820 that allow software and data to be transferred from the storage unit 822 to computing module 800.

Computing module 800 might also include a communications interface 824. Communications interface 824 might be used to allow software and data to be transferred between computing module 800 and external devices. Examples of communications interface 824 might include a peripheral interface such as the Peripheral Component Interconnect Express (PCIe) interface, a modem or softmodem, a network interface (such as an Ethernet, network interface card, WiMedia, IEEE 802.XX or other interface), a BLUETOOTH interface, a communications port (such as for example, a USB port, USB-C port, THUNDERBOLT port, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory mediums, volatile or non-volatile, such as, for example, memory 808, storage unit 822, and media 814. These and other various forms of computer program media or computer usable media may be involved in carrying one or more sequences of one or more instructions to a processor for execution. Such instructions embodied on the medium, are generally referred to as "computer program code" or a "computer program product" (which may be grouped in the form of computer programs or other groupings). When executed, such instructions might enable the computing module 800 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be appreciated that all combinations of the foregoing concepts (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

What is claimed is:

1. A non-transitory computer readable medium having executable instructions stored thereon that, when executed by a processor, causes the processor to perform operations comprising:
   retrieving an entity description dataset, the entity description dataset including a plurality of character strings describing the same entity, each of the plurality of character strings collected from a respective one of a plurality of data sources;
   for each of the plurality of character strings, extracting numbers from the character string that identify the entity;
   performing a numerical comparison of the numbers extracted from each of the plurality of character strings to determine if one or more of the plurality of character strings needs to be discarded from further consideration, the numerical comparison comprising: determining if the numbers extracted from each of the plurality of character strings match with the numbers extracted from the other plurality of character strings;
   applying a text cleaning process to normalize for textual comparison the plurality of character strings;
   after performing the numerical comparison and applying the text cleaning process, performing a textual centrality measure of a remaining plurality of character strings to determine a level agreement of each of the remaining plurality of character strings with each of the other remaining plurality of character strings; and
   using at least the textual centrality measure to select a character string from the remaining plurality of character strings having a highest level of agreement with each of the other remaining plurality of character strings.

2. The non-transitory computer readable medium of claim 1, wherein the operations further comprise: calculating a confidence score of the selected character string, wherein the confidence score is calculated using at least the textual centrality measure.

3. The non-transitory computer readable medium of claim 2, wherein the operations further comprise:
   determining that the calculated confidence score falls above or below a predetermined threshold; and
   in response to determining that the calculated confidence score falls above or below a predetermined threshold, perform additional operations or presenting a notification to the user.

4. The non-transitory computer readable medium of claim 1, wherein
   performing the textual centrality measure comprises: calculating a levenshtein distance between each of the remaining plurality of character strings and each of the other remaining plurality of character strings.

5. The non-transitory computer readable medium of claim 1, wherein the operations further comprise: for each of the plurality of character strings, concatenating into a number string the numbers extracted from the character string, wherein performing a numerical comparison of the numbers extracted from each of the plurality of character strings comprises: comparing the concatenated number strings.

6. The non-transitory computer readable medium of claim 1, wherein the operations further comprise: populating a document describing the entity with text of the selected character string.

7. The non-transitory computer readable medium of claim 6, wherein the entity is a real property, wherein the plurality of character strings of the dataset describe the real property, wherein the document is a title document.

8. The non-transitory computer readable medium of claim 7, wherein the numbers extracted from each of the plurality of character strings comprise a lot number and a tract number.

9. The non-transitory computer readable medium of claim 7, wherein the operations further comprise: receiving a search query for the real property through a web-based application instance, wherein the web-based application instance retrieves the description dataset in response to the search query.

10. The non-transitory computer readable medium of claim 9, wherein the web-based application instance retrieves the description dataset by initiating a proxy call to each of the plurality of data sources for information related to the searched property.

11. The non-transitory computer readable medium of claim 7, wherein the operations further comprise:
    calculating a confidence score of the selected character string, wherein the confidence score is calculated using at least the textual centrality measure; and
    providing a web-based notification to a title examiner of the confidence score.

12. The non-transitory computer readable medium of claim 1, wherein the operations further comprise:
    classifying one or more of the plurality of character strings of the entity description dataset; and
    using at least the classification, determining whether or not to automatically select a character string from the plurality of character strings.

13. A computer-implemented method, comprising:
    retrieving a real property description dataset, the real property description dataset including a plurality of descriptions describing the same real property, each of the plurality of descriptions collected from a respective one of a plurality of data sources;
    for each of the plurality of descriptions, extracting numbers from the description that identify the real property;
    performing a numerical comparison of the numbers extracted from each of the plurality of descriptions to determine if one or more of the plurality of descriptions needs to be discarded from further consideration, the numerical comparison comprising: determining if the numbers extracted from each of the plurality of descriptions match numbers extracted from the other plurality of descriptions;
    applying a text cleaning process to normalize for textual comparison the plurality of descriptions;
    after applying the numerical comparison and text cleaning process, performing a textual centrality measure of a remaining plurality of descriptions to determine a level agreement of each of the remaining plurality of descriptions with each of the other remaining plurality of descriptions; and using at least the textual centrality measure to select a description from the remaining descriptions having a highest level of agreement with each of the other remaining plurality of descriptions.

14. The method of claim 13, wherein performing the textual centrality measure comprises: calculating a levenshtein distance between each of the remaining plurality of descriptions and each of the other remaining plurality of descriptions.

15. The method of claim 13, wherein the numbers extracted from each of the plurality of descriptions comprise a lot number and a tract number.

16. The method of claim 13, further comprising: receiving a search query for the real property through a web-based application instance, wherein the web-based application instance retrieves the description dataset in response to the search query.

17. The method of claim 16, wherein the web-based application instance retrieves the description dataset by initiating a proxy call to each of the plurality of data sources for information related to the searched real property.

18. The method of claim 13, further comprising:
calculating a confidence score of the selected description, wherein the confidence score is calculated using at least the textual centrality measure; and
providing a web-based notification to a title examiner of the confidence score.

19. The method of claim 18, further comprising:
classifying one or more of the plurality of descriptions of the real property description dataset; and
using at least the classification, determining whether or not to automatically select a description from the plurality of descriptions to populate the title document; and
populating a title document describing the real property with text of the selected description.

20. A system, comprising:
a processor; and
a non-transitory computer readable medium having executable instructions stored thereon that, when executed by the processor, cause the processor to perform operations comprising:
retrieving a real property description dataset, the real property description dataset including a plurality of descriptions describing the same real property, each of the plurality of descriptions collected from a respective one of a plurality of data sources;
for each of the plurality of descriptions, extracting numbers from the description that identify the real property;
performing a numerical comparison of the numbers extracted from each of the plurality of descriptions to determine if one or more of the plurality of descriptions needs to be discarded from further consideration, the numerical comparison comprising: determining if the numbers extracted from each of the plurality of descriptions match numbers extracted from the other plurality of descriptions;
applying a text cleaning process to normalize for textual comparison the plurality of descriptions;
after applying the numerical comparison and text cleaning process, performing a textual centrality measure of a remaining plurality of descriptions to determine a level agreement of each of the remaining plurality of descriptions with each of the other remaining plurality of descriptions; and
using at least the textual centrality measure to select a description from the remaining descriptions having a highest level of agreement with each of the other remaining plurality of descriptions.

* * * * *